Figure 1:
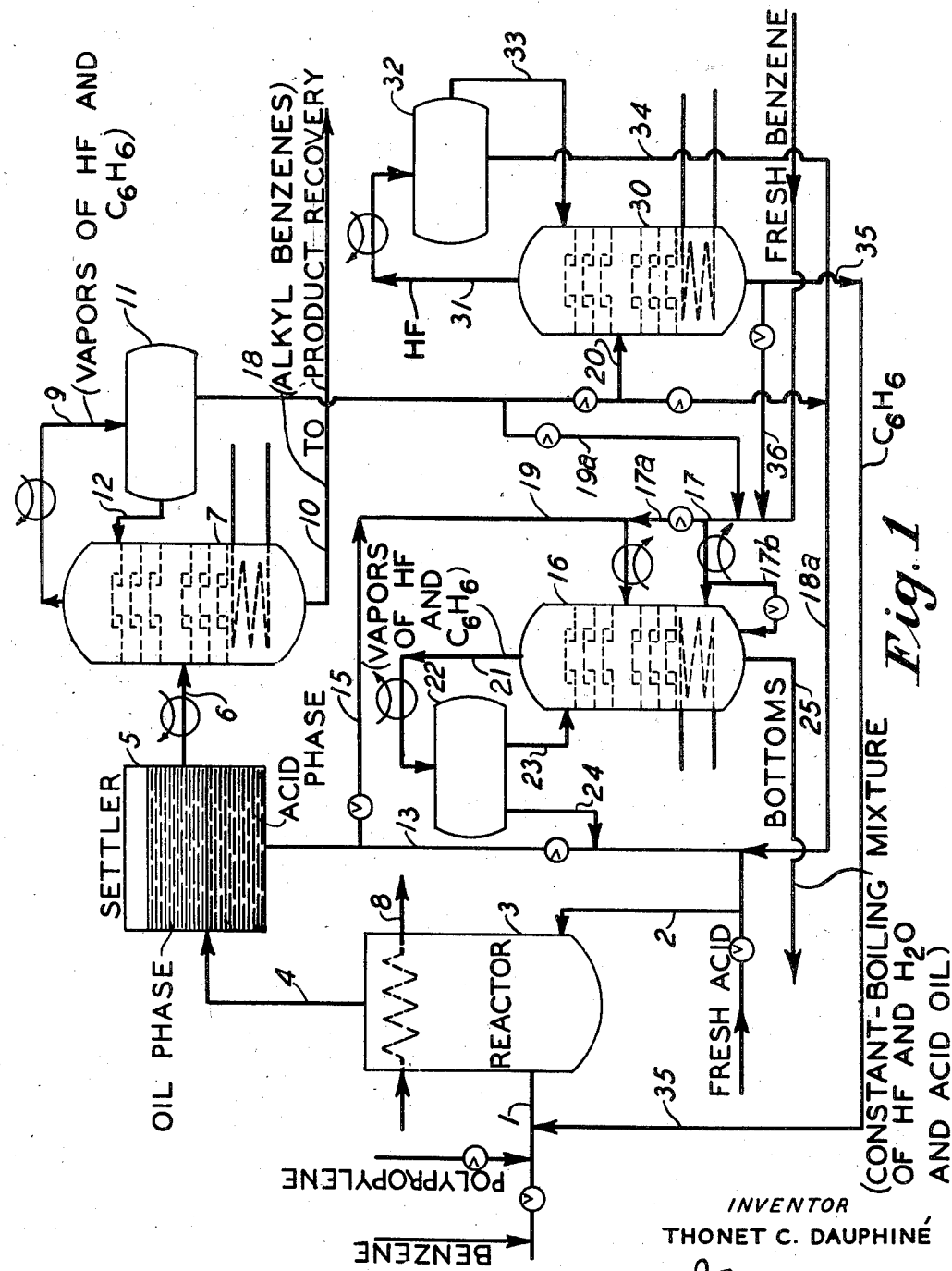

Nov. 21, 1950 — T. C. DAUPHINÉ — 2,531,112
REGENERATION OF HYDROFLUORIC ACID CATALYST
Filed June 2, 1947

INVENTOR
THONET C. DAUPHINÉ
ATTORNEYS

UNITED STATES PATENT OFFICE

2,531,112

REGENERATION OF HYDROFLUORIC ACID CATALYST

Thonet C. Dauphiné, Irvington on Hudson, N. Y., assignor to California Research Corporation, San Francisco, Calif., a corporation of Delaware Application June 2, 1947, Serial No. 751,934

3 Claims. (Cl. 202—46)

This invention relates to an improved method of regenerating spent hydrofluoric acid catalyst contained in the effluents from the reaction of alkylation of benzene with olefins. More specifically, it relates to the recovery of hydrofluoric acid catalyst from the effluents of the alkylation of benzene with $C_9$ to $C_{18}$ polypropylene, and preferably with $C_{12}$ to $C_{15}$ polypropylene.

Hydrofluoric acid constitutes an effective catalyst for the alkylation of benzene with olefins. In the preferred embodiment of this invention, hydrofluoric acid is used to catalyze the alkylation of benzene with normally liquid polymers of olefins, more particularly with tetramers and/or pentamers of propylene. This reaction of alkylating benzene with olefins is brought about by intimately contacting the hydrocarbon reactants and the hydrofluoric acid catalyst in any of the conventional type of alkylation equipment well known to those skilled in the art, so long as it is resistant to corrosion by hydrofluoric acid. Upon the completion of alkylation, the reaction mixture is transferred to a settling zone, where a lower acid phase is separated from an upper oil phase. In continuous operation, notwithstanding careful dehydration of the hydrocarbon feed, some water unavoidably is carried into the alkylation zone, and the acid phase contains hydrofluoric acid and accumulated water, while the oil phase contains benzene and benzene alkylates. Furthermore, under the conditions existing in the alkylation zone in close contact with hydrofluoric acid, the olefin constituents of the hydrocarbon feed undergo a variety of unwanted, though unavoidable side reactions and produce a considerable amount of carbonaceous material of undetermined nature, commonly designated as "acid oil." This acid oil likewise remains in the lower acid phase on settling. Upon establishment of the phase equilibrium some hydrofluoric acid will be retained in the oil phase while some oil, i. e., benzene and/or benzene alkylate, will be present in the acid. The acid phase may be recycled to the alkylation zone or may be subjected to a regenerating treatment, in accordance with the invention described hereinafter, while the oil phase is subjected to various treatments for the purposes of purification and recovery of the desired alkyl benzene fractions.

In a continuous alkylation process where the hydrofluoric acid catalyst is recirculated, eventual building up of the acid oil and accumulation of water admixture are apt to contaminate the hydrofluoric acid, to the extent of occasioning a substantial impairment or destruction of its catalytic efficacy with the resulting adverse effect upon the over-all efficiency and continuity of the process.

In view of the cost of the fresh acid, it is highly desirable to have adequate and economical methods of regenerating the contaminated or "spent" acid, instead of too frequently discarding it and admitting fresh acid into the system. Various methods have been proposed in the past to effect the separation of hydrofluoric acid from its contaminants during the alkylation of benzene. Methods have been suggested for stripping the spent acid with the aid of low-boiling paraffins, such as normal butane or isobutane. However, a number of difficulties are involved in these methods of recovering hydrofluoric acid. For instance, normal butane builds up in the alkylation system and eventually requires an additional onerous distillation step to remove it from the system. On the other hand, isobutane, in addition to the eventual necessity of removing it, possesses the disadvantage of causing considerable alkylation of olefins.

It is the object of this invention to provide an improved method for the regeneration of the hydrofluoric acid catalyst, avoiding all of the aforementioned disadvantages.

It is another object to provide a method of obtaining regenerated hydrofluoric acid which is no less satisfactory for the alkylation of benzene than the original fresh acid.

Still another object is to effect an economy of the hydrofluoric acid catalyst by prolonging its effective life through repeated regenerations.

A more particular object of the invention is to provide an improved method of regenerating hydrofluoric acid catalyst contaminated during the process of benzene alkylation with olefins, said regeneration method comprising stripping the spent catalyst with benzene.

All these objects and advantages are secured by stripping the spent hydrofluoric acid catalyst with the aid of benzene, as will now be shown by the following description of the new process of the invention, illustrated by the flow diagram in Figure 1.

In this diagram the hydrocarbon feed, such as benzene and polypropylene, and the fresh catalyst arrive through lines 1 and 2 to reactor 3 where the alkylation takes place, the reaction temperatures being controlled by suitable cooling means, such as coil 8. This reactor is operated at temperatures between that slightly above the freezing point of benzene and about 150° F. with pressure sufficient to maintain the alkylation mixture in the liquid phase. Benzene is supplied in a comparatively large excess in order to insure a complete alkylation. Upon completion of the contact, the reaction mix is passed through line 4 into settler 5 in which two phases are separated; the upper oil phase is sent through line 6 into fractionator 7, while the lower acid phase is withdrawn from the settler through line 13, either to be directly recycled to reactor 3, or to pass by way of lines 15 and 19 to fractionator 16, where it is subjected to stripping in accordance with the principles of the present invention. Meanwhile, the oil phase may be freed from benzene and hydrofluoric acid by any conventional method, for instance, by fractional distillation and by a subsequent conventional defluorination of the remaining mixture of alkyl benzenes, e. g., with dehydrated beauxite. The benzene-free and defluorinated mixture of alkyl benzene is then passed to the ultimate product recovery.

As mentioned hereinbefore, in continuous operation the hydrofluoric acid eventually becomes contaminated with unavoidable admixtures of water and acid oil, and loses its efficacy as a catalyst for the alkylation of benzene. Therefore, instead of recycling the acid phase from settler 5 or rejecting it to be replaced with fresh hydrofluoric acid, it is sent through line 15 and line 19 provided with a preheater to fractionator 16 to be regenerated. There the application of benzene as a stripping agent, in accordance with the invention, solves the heretofore difficult problem of acid purification and recovery. The acid phase, upon arrival into fractionator 16 contains hydrofluoric acid, water and considerable acid oil. The part assigned by the invention to benzene is that of "stripping"—carrying off the free acid, uncombined with water, from the acid phase mixture in the fractionator. In order to effect the regeneration or purification of the acid catalyst by the fractionation treatment of the present invention, benzene is preheated and is introduced in the vapor phase into fractionator 16 to sweep away most of the free hydrofluoric acid from its intimate mixture with acid oil and water (the latter being present in the form of an azeotrope with the acid) thereby securing a more complete separation of uncombined free acid at considerably lower temperatures than would be required for such separation without benzene.

The regeneration process is carried out by admitting fresh benzene through line 17 provided with a preheater into fractionator 16. If desired, a portion of benzene may be diverted through valve-controlled line 17a into line 19 to dilute the acid phase mixture. In order to start up the operation a heating oil is provided in the bottom portion of fractionator 16, or, alternatively, a portion of hot benzene may be introduced through line 17b as shown in the flow diagram. Hydrofluoric acid and benzene in vapor phase pass overhead into line 21 and thence into condensate drum 22, whence some of the condensate may be refluxed to the fractionator through line 23, while the remaining condensed mixture of hydrofluoric acid and benzene proceeds through lines 24, 13 and 2 to reactor 3. Bottoms from fractionator 16, which consist of the constant-boiling mixture of hydrofluoric acid and water, and acid oil, are discharged through line 25.

A modification of the process, which permits of realizing an important economy of benzene, becomes apparent from the consideration of the preferred operation of fractionator 7.

Fractionator 7 is operated at a temperature between above about 425° F. and 550° F., and preferably between about 425° F. and 450° F., under a pressure ranging from the atmospheric to as high as 15–20 p. s. i. g., sufficient to effect a substantial thermal defluorination of the oil phase as claimed in the copending application of Lloyd F. Brooke, James B. Cull and Bernard E. Berlenbach, Serial No. 751,936, filed June 2, 1947. Simultaneously with the thermal defluorination of the oil phase, benzene and hydrofluoric acid are vaporized overhead and pass through line 9 to a condensate drum 11, while the alkyl benzenes are taken out from the bottom of fractionator 7 to the product recovery. In order to effect a better separation of benzene, a portion of the distillate collected in drum 11 may be refluxed to fractionator 7 through line 12. The condensed benzene-acid mixture is removed from drum 11 through lines 18 and 18a, passes into recycle line 13, and thence is directly recycled to reactor 3; if desired, it may be directed from line 18 into a valve-controlled line 19a, and thence into line 17 and fractionator 16 where, because of the relatively large excess of benzene in the mixture, it may be used as a stripping agent in lieu of, or as a supplement of, fresh benzene. By utilizing this benzene-acid mixture as a stripping agent to effectuate the regeneration of the hydrofluoric acid catalyst in lieu of fresh benzene, a considerable saving of benzene is realized.

Ordinarily a mixture of two liquid phases: an upper oil (benzene) phase and a lower acid phase, is obtained in condensate drum 11, and their separation from each other by gravity may be effected thereafter, if so desired. However, as here shown, it is preferred to separate the two phases by sending the mixture of phases through lines 18 and 20 into fractionator 30, where hydrofluoric acid is separated from benzene. The acid goes overhead through line 31 into a condensate drum 32. A portion of the acid condensate may be refluxed to fractionator 30 through line 33, while the remaining condensate is recycled through lines 34, 18a, 13 and 2 to reactor 3. Benzene is removed from fractionator 30 as bottoms and is either recycled through lines 35 and 1 to reactor 3, or, alternatively, may be directed through lines 35, 36 and 17 to replace or supplement fresh benzene for the stripping of hydrofluoric acid in fractionator 16.

The choice of the various modifications of the present process is a matter of judgment for the one skilled in the art in the light of the particular conditions of each case, the invention, as stated, embracing many modifications and variations of the process consistent with the statement of the claims appended hereinafter.

Likewise, it is to be understood that the aforedescribed flow diagram is merely schematic, no numerals having been assigned to any valves or preheaters shown therein, and that the use of appropriate accessory equipment, which would be obvious to those skilled in the art from the above description, is to be included within the scope of the present invention.

Distillation runs carried out in the laboratory illustrate the advantages secured by the novel method of regenerating the hydrofluoric acid catalyst for the alkylation of benzene.

*Run 1.*—This run was carried out at atmospheric pressure in a distillation still made of steel and packed with steel helices. There was no provision for automatically controlling the reflux ratio. The 502 g. sample of contaminated hydrofluoric acid contained 425 g. of 100% acid; 445 g. of benzene was used to strip the contaminated catalyst. Six cuts were taken between 75 and 185° F. The first three cuts: 75–82° F.; 82–84° F. and 105–200° F. yielded 88.7% by weight of substantially water-free hydrofluoric acid (average water content about 1.9 wt. %).

*Run 2.*—To minimize the acid loss due to corrosion, observed during Run 1, the distillation was carried out in an all-monel still packed with monel packing. The fractionation was effected under a pressure of 20 p. s. i. g., maintaining a reflux ratio of 6:1. The sample weighing 510 g. contained 421 g. of 100% hydrofluoric acid and about 7.9% water, while the weight of benzene used for stripping was equal to 462 g. Four cuts were taken: 70–104° F.; 104–105° F.; 105–200° F. and 200–204° F. A good yield (over 96% by weight) of substantially water-free regenerated hydrofluoric acid (it contained on the average about 2.2 wt. % of water) was obtained in the first three cuts. The major portion of water in the form of its constant-boiling mixture with hydrofluoric acid, and the carbonaceous acid oil were present in the bottoms as two distinct phases.

These runs show unmistakably that spent hydrofluoric acid catalyst from the alkylation of benzene with olefins can be regenerated substantially free of water by employing benzene as a stripping agent. The fact that a large portion of benzene passes with the regenerated catalyst to the alkylation zone is not a drawback, but, in fact, an advantage, since an excess of benzene contributes to the completeness of alkylation and cuts down side reactions.

Whenever the bromine number of the acid oil contained in the bottoms from the stripping of spent hydrofluoric acid catalyst with benzene in accordance with the invention is of the order of less than about 30, instead of discarding the acid oil as a waste product, it may be recovered from the bottoms and neutralized, e. g., with a solution of potash, whereupon benzene and alkyl benzenes contained therein may be separated and either recycled to the alkylation zone or used in some other manner.

The method of applying benzene as a stripping agent for the regeneration of spent hydrofluoric acid in the alkylation of benzene with polypropylene is wholly novel and unexpected. In similar applications of benzene in distilling other mixtures, for instance, in the distillation of alcohol, certain difficulties occur, such as the carry-over of water. The present process of regeneration is unique in that, surprisingly enough, carry-over of water and foaming are substantially minimized, and in spite of the high temperature, the loss of benzene to the olefinic bottoms is small. Furthermore, the use of benzene in this new method of catalyst regeneration, aside from the elimination of distillation difficulties, dispenses with the use of additional chemical agents, e. g., butane, for stripping or extracting the spent catalyst, and thus saves costs. The aforedescribed alternative method of using the benzene-acid mixture recoverable as overhead from the defluorinating-fractionating column in lieu of resorting to a supply of fresh benzene permits an even greater reduction of costs.

It has been observed that the wetting and detergent properties of the alkyl benzene sulfonates from the sulfonation of alkyl benzenes produced with the aid of regenerated hydrofluoric acid are equivalent to those of the sulfonates obtained through the use of fresh acid. This equivalency is apparent from Table 1 below which contains the comparative detergency ratings of the two types of sodium alkyl benzene sulfonates with reference to a standard of detergency obtained with an 0.2% concentration of a well-known commercial sodium alkyl sulfate synthetic detergent in hard water (300 parts per million=200 parts $CaCO_3$+100 parts $MgCO_3$) and assumed to be equal 100.

TABLE 1

*Effect of acid source on detergency of sodium alkyl benzene sulfonates*

| Run # | Acid | Benzene to Polymer Mol Ratio | Olefin Vol. per Vol. HF per Hr. | Temp., °F. | Alkyl Benzene Yield | Detergency Rating |
|---|---|---|---|---|---|---|
| 430 | Fresh | 10:1 | 0.52 | 50 | 1.0 | 104 |
| 431 | Regenerated | 10:1 | 0.66 | 50 | 1.0 | 110 |

It is understood that all of the examples and data hereineabove disclosed are merely illustrative, and that the scope of the invention is not to be limited thereto except as defined in the following claims:

I claim:

1. A process for the recovery of substantially water-free hydrofluoric acid from a spent benzene alkylation catalyst containing a mixture of hydrofluoric acid, water and acid oil, which comprises preheating said spent catalyst mixture to a temperature of at least above the boiling point of benzene, introducing a stream of vaporized benzene into said spent catalyst mixture, and withdrawing therefrom said vaporized benzene having entrained therein water-free hydrofluoric acid.

2. A process for the recovery of substantially water-free hydrofluoric acid from a spent benzene alkylation catalyst containing a mixture of hydrofluoric acid, water and acid oil, which comprises preheating said spent catalyst mixture to a temperature of at least above the boiling point of benzene, introducing a stream of a mixture of vaporized benzene and hydrofluoric acid into the spent catalyst mixture, and withdrawing therefrom said mixture of vaporized benzene and hydrofluoric acid having entrained therein water-free hydrofluoric acid from said spent catalyst mixture.

3. A process for the recovery of substantially water-free hydrofluoric acid from a spent catalyst for the alkylation of benzene with polypropylene, containing a mixture of hydrofluoric acid, water and aromatic acid oil, which comprises preheating said spent catalyst mixture of hydrofluoric acid, water and aromatic acid oil to a temperature of at least above the boiling point of benzene, introducing a stream of vaporized benzene into said spent catalyst mixture, and withdrawing therefrom said vaporized benzene having entrained therein water-free hydrofluoric acid.

THONET C. DAUPHINÉ.

REFERENCES CITED

The following references are of record in the file of this patent:

UNITED STATES PATENTS

| Number | Name | Date |
|---|---|---|
| 2,232,117 | Kyrides | Feb. 18, 1941 |
| 2,404,340 | Zimmerman | July 16, 1946 |
| 2,408,933 | Iverson | Oct. 8, 1946 |
| 2,417,875 | Leonard | Mar. 25, 1947 |
| 2,423,470 | Simons | July 8, 1947 |
| 2,425,752 | McKenna | Aug. 19, 1947 |
| 2,468,756 | Iverson | May 3, 1949 |

OTHER REFERENCES

Simons "Potential Use—Processes" Ind. & Eng. Chem. vol. 32, No. 2 (Feb. 1940), pages 178–183 (6 pages).